(12) United States Patent
Guan

(10) Patent No.: US 11,696,376 B2
(45) Date of Patent: Jul. 4, 2023

(54) METHOD, DEVICE, AND SYSTEM FOR REGULATING TEMPERATURE OF MAGNETRON, VARIABLE-FREQUENCY POWER SUPPLY, AND MICROWAVE APPARATUS

(71) Applicant: SHENZHEN MEGMEET ELECTRICAL CO., LTD, Shenzhen (CN)

(72) Inventor: Jihong Guan, Shenzhen (CN)

(73) Assignee: SHENZHEN MEGMEET ELECTRICAL CO., LTD, Shenzhen (CN)

( * ) Notice: Subject to any disclaimer, the term of this patent is extended or adjusted under 35 U.S.C. 154(b) by 558 days.

(21) Appl. No.: 16/857,314

(22) Filed: Apr. 24, 2020

(65) Prior Publication Data

US 2020/0253006 A1 Aug. 6, 2020

Related U.S. Application Data

(63) Continuation of application No. PCT/CN2018/083390, filed on Apr. 17, 2018.

(30) Foreign Application Priority Data

Oct. 30, 2017 (CN) .......................... 201711035721.6

(51) Int. Cl.
*H05B 6/66* (2006.01)
*H05B 6/68* (2006.01)

(52) U.S. Cl.
CPC ............. *H05B 6/682* (2013.01); *H05B 6/664* (2013.01); *H05B 2206/043* (2013.01)

(58) Field of Classification Search
CPC ... H02M 3/28; H05B 2206/043; H05B 6/664; H05B 6/666; H05B 6/682
(Continued)

(56) References Cited

U.S. PATENT DOCUMENTS 3,876,956 A * 4/1975 Levinson .................. H03B 9/10
331/185
4,481,447 A 11/1984 Stupp et al.
(Continued)

FOREIGN PATENT DOCUMENTS

CN 103906285 A 7/2014
CN 104090624 A 10/2014
(Continued)

*Primary Examiner* — Quang T Van
(74) *Attorney, Agent, or Firm* — IPro, PLLC

(57) ABSTRACT

A method and device for regulating a temperature of a magnetron, a controller, a variable-frequency power supply, a system for regulating a temperature of a magnetron, and a microwave apparatus are provided. Wherein, the method for regulating the temperature of the magnetron includes: determining an anode current flowing through the magnetron or an input power of a variable-frequency power supply or an anode voltage applied to two ends of the magnetron, the input power or an output power of the variable-frequency power supply being configured to drive the magnetron to operate; regulating the output power of the variable-frequency power supply according to the anode current or the input power or the anode voltage.

19 Claims, 11 Drawing Sheets

(58) Field of Classification Search
USPC .............. 219/715, 716, 717, 718, 702, 761;
331/71, 185, 86, 101, 91, 105, 106, 107,
331/307; 363/21, 28, 96
See application file for complete search history.

(56) References Cited

U.S. PATENT DOCUMENTS 4,835,354 A     5/1989  Collins et al.
5,571,439 A *  11/1996  Daley .................... H05B 6/683
                                                              315/106

FOREIGN PATENT DOCUMENTS

| | | |
|---|---|---|
| CN | 104968061 A | 10/2015 |
| CN | 105142254 A | 12/2015 |
| CN | 105744667 A | 7/2016 |
| CN | 107896393 A | 4/2018 |
| JP | 1997129147 A | 5/1997 |

* cited by examiner

METHOD, DEVICE, AND SYSTEM FOR REGULATING TEMPERATURE OF MAGNETRON, VARIABLE-FREQUENCY POWER SUPPLY, AND MICROWAVE APPARATUS

CROSS-REFERENCE TO RELATED APPLICATION

This disclosure is a continuation of International Patent Application No. PCT/CN2018/083390, filed on Apr. 17, 2018, which is based upon and claims priority of Chinese Patent Application No. 201711035721.6, filed on Oct. 30, 2017, titled "METHOD, DEVICE, AND SYSTEM FOR REGULATING TEMPERATURE OF MAGNETRON, VARIABLE-FREQUENCY POWER SUPPLY, AND MICROWAVE APPARATUS", the entire contents of which are incorporated herein by reference.

TECHNICAL FIELD

The present application relates to the technical field of microwave apparatuses, and in particular, relates to a method and device for regulating a temperature of a magnetron, a controller, a variable-frequency power supply, a system for regulating a temperature of a magnetron, and a microwave apparatus.

BACKGROUND

Microwave apparatuses are extensively applied in various fields, including industrial applications, military applications, civil applications and the like.

A traditional microwave apparatus may drive a magnetron to generate microwaves, such that the microwaves affect a load of the microwave apparatus.

During practice of the present application, the applicant has identified that the related art has at least the following problem: In the process that the microwave apparatus affects the load, due to uncertainty of the load, the temperature of the magnetron may abruptly rise; and in this case, if no appropriate measures are taken, the magnetron is apt to be subjected to over-temperature and thus damaged. As a result, the life time of the magnetron is greatly shortened.

SUMMARY

In a first aspect, embodiments of the present application provide a method for regulating a temperature of a magnetron. The method includes: determining an anode current flowing through the magnetron or an input power of a variable-frequency power supply or an anode voltage applied to two ends of the magnetron, an output power of the variable-frequency power supply being configured to drive the magnetron to operate; regulating the output power of the variable-frequency power supply according to the anode current or the input power or the anode voltage.

In a second aspect, embodiments of the present application provide a device for regulating a temperature of a magnetron. The device includes: a determining module, configured to determine an anode current flowing through the magnetron or an input power of a variable-frequency power supply or an anode voltage applied to two ends of the magnetron, the input power or an output power of the variable-frequency power supply being configured to drive the magnetron to operate; a regulating module, configured to regulate the output power of the variable-frequency power supply according to the anode current or the input power or the anode voltage.

In a third aspect, embodiments of the present application provide a controller. The controller includes: at least one processor; and a memory communicably connected to the at least one processor; wherein the memory stores instructions executable by the at least one processor, wherein the instructions, when being executed by the at least one processor, cause the at least one processor to perform the method for regulating the temperature of the magnetron as described above.

In a fourth aspect, embodiments of the present application provide a variable-frequency power supply for driving a magnetron. The variable-frequency power supply includes: a variable-frequency circuit, configured to drive the magnetron; a first voltage sampling circuit, configured to sample a first output voltage of the variable-frequency circuit, the first output voltage being in a corresponding relationship with an anode voltage applied to two ends of the magnetron, the first voltage sampling circuit including a first input terminal, a second input terminal and a first output terminal, the first input terminal being connected to a first node between the variable-frequency circuit and the magnetron, the second input terminal being connected to a second node between the variable-frequency circuit and the magnetron; the controller as described above, which is connected to the first output terminal of the first voltage sampling circuit and the variable-frequency circuit, the controller calculating the anode voltage applied to the two ends of the magnetron according to the corresponding relationship between the first output voltage and the anode voltage applied to the two ends of the magnetron.

In a fifth aspect, embodiments of the present application provide a system for regulating a temperature of a magnetron. The system includes: the magnetron; a variable-frequency power supply, connected to the magnetron, and configured to drive the magnetron; a second voltage sampling circuit, coupled between the variable-frequency power supply and the magnetron, and configured to sample a second output voltage of the variable-frequency power supply, the second output voltage being in a corresponding relationship with an anode voltage applied to two ends of the magnetron; the controller as described above, which is connected to an output terminal of the second voltage sampling circuit and the variable-frequency circuit, the controller calculating the anode voltage applied to the two ends of the magnetron according to the corresponding relationship between the second output voltage and the anode voltage applied to the two ends of the magnetron.

In a sixth aspect, embodiments of the present application provide a microwave apparatus. The microwave apparatus includes the controller as described above.

In a seventh aspect, embodiments of the present application provide a non-transitory computer-readable storage medium. The non-transitory computer-readable storage medium stores computer-executable instructions, which, when being executed, cause the microwave apparatus to perform the method for regulating the temperature of the magnetron as described above.

BRIEF DESCRIPTION OF THE DRAWINGS

One or more embodiments are illustrated by way of example, and not by limitation, in the figures of the accompanying drawings, wherein components having the same

FIG. 11 is a schematic structural diagram of a determining unit in FIG. 10a;

FIG. 12 is a schematic structural diagram of a regulating unit in FIG. 10a;

FIG. 13 is another schematic structural diagram of the regulating unit in FIG. 10a;

FIG. 16 is a schematic flowchart of step 521 in FIG. 15a;

FIG. 17 is a schematic flowchart of step 523 in FIG. 15a;

FIG. 18 is another schematic flowchart of step 523 in FIG. 15a;

DETAILED DESCRIPTION

For clearer descriptions of the objectives, technical solutions, and advantages of the present application, the present application is further described with reference to specific embodiments and attached drawings. It should be understood that the specific embodiments described herein are only intended to explain the present application instead of limiting the present application.

Microwave apparatuses according to the embodiments of the present application include industrial microwave apparatuses, medical microwave apparatuses, civil microwave apparatuses, military microwave apparatuses and the like. In the industrial applications, the industrial microwave apparatuses may be used to quickly heat, dry and modify materials. In the medical applications, the medical microwave apparatuses may be used to sterilize drugs or medicaments, and ablate lesions. In the civil applications, the civil microwave apparatuses may be used to microwave food or the like. In the military applications, the microwave apparatuses may be used for target detection, navigation or the like.

The microwave apparatus according to the embodiments of the present application may be a variable-frequency microwave apparatus, or may be another type of microwave apparatus.

Figure 1:
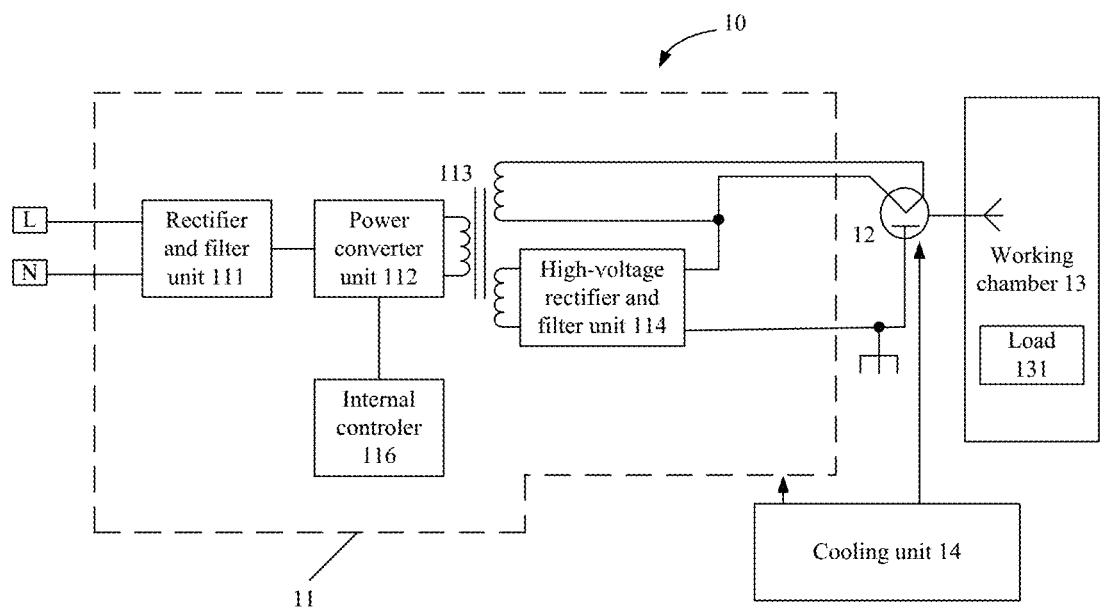
FIG. 1 is a schematic structural diagram of a microwave apparatus according to an embodiment of the present application.

Referring to FIG. 1, FIG. 1 is a schematic structural diagram of a microwave apparatus 10 according to an embodiment of the present application. As illustrated in FIG. 1, the microwave apparatus 10 includes: a variable-frequency power supply 11, a magnetron 12, an working chamber 13 and a cooling unit 14, wherein the variable-frequency power supply 11 is connected to the magnetron 12.

Still referring to FIG. 1, the variable-frequency power supply 11 includes a rectifier and filter unit 111, a power converter unit 112, a high-voltage transformer 113, a high-voltage rectifier and filter unit 114 and an internal controller 116. An input terminal of the rectifier and filter unit 111 is connected to an external power supply, an output terminal of the rectifier and filter unit 111 is connected to an input terminal of the power converter unit 112, an output terminal of the power converter unit 112 is connected to a primary winding of the high-voltage transformer 113, a secondary winding of the high-voltage transformer 113 is connected to an input terminal of the high-voltage rectifier and filter unit 114, an output terminal of the high-voltage rectifier and filter unit 114 is connected to the magnetron 12, and the controller 116 is connected to the power converter unit 112.

The variable-frequency power supply 11 may drive the magnetron 12 to operate, and supply a desired voltage and current to the magnetron 12. The rectifier and filter unit 111 is connected to the external power supply, and rectifies and filters the external power supply and outputs a direct-current voltage. The external power supply may be a mains voltage, or may be an industrial voltage.

The internal controller 116 acquires an input voltage, a current and the like information, calculates an input power for actual operation, converts the input power to a desired pulse width modulation (PWM) signal or a pulse frequency modulation (PFM) signal or a hybrid wave of the two for driving the power converter unit 112 to operate according to a rated power.

An output of the high-voltage transformer 113 is processed by the high-voltage rectifier and filter unit 114, and the high-voltage rectifier and filter unit 114 outputs a smooth direct-current high voltage and supplies the voltage to an anode of the magnetron 12. In addition, the high-voltage rectifier and filter unit 114 also supplies a filament voltage to a filament of the magnetron 12.

The magnetron 12 is capable of converting electrical energy supplied by the variable-frequency power supply 11 to a corresponding microwave to heat a load 131 placed in the working chamber 13. For example, when the microwave apparatus is a microwave oven, the working chamber 13 accommodates food to be microwave-heated.

Figure 1A:
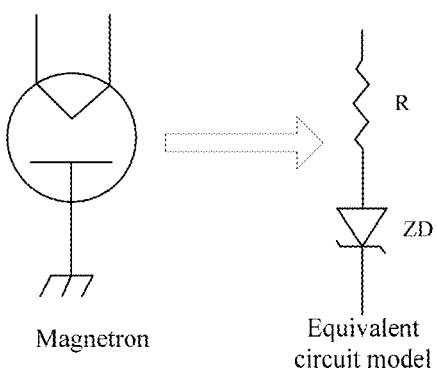
FIG. 1a is a schematic diagram of an equivalent circuit model of a magnetron according to an embodiment of the present application.

Referring to FIG. 1a, FIG. 1a is a schematic diagram of an equivalent circuit model of the magnetron according to an embodiment of the present application. As illustrated in FIG. 1a, since the magnetron 12 is a vacuum electron tube, the equivalent circuit model thereof may be equivalent to a circuit model constituted by a Zener diode ZD and an equivalent resistor R that are connected in series, wherein a stabilized voltage of the Zener diode ZD is an anode threshold voltage of the magnetron 12, and the equivalent resistor R is an equivalent resistor of the magnetron 12.

Figure 1B:
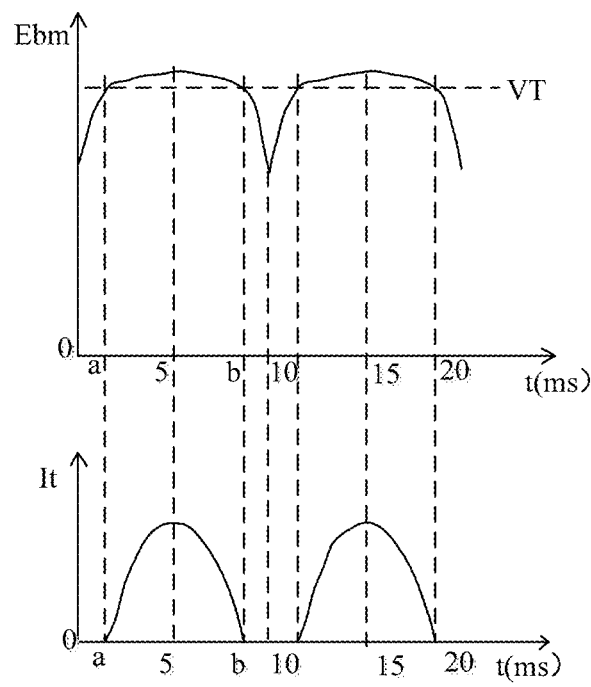
FIG. 1b is a schematic diagram of variations of an anode voltage applied to two ends of a magnetron and a current flowing through the magnetron with the time according to an embodiment of the present application.

Referring to FIG. 1b, FIG. 1b is a schematic diagram of variations of an anode voltage applied to two ends of a magnetron and a current flowing through the magnetron with the time according to an embodiment of the present application. As illustrated in FIG. 1b, the ordinate of the coordinate axes denotes an anode voltage which is marked as Ebm, and the abscissa denotes time which is marked as t. Further, an anode threshold voltage is marked as VT. The ordinate of the coordinate axes 1b2 denotes an anode current which is marked as It, and the abscissa denotes time t.

As seen from FIG. 1b, when the magnetron 12 is connected to a commercial power supply, at the zero point of the coordinate axes, when the voltage of the commercial power supply is at the zero-crossing, an absolute value of an anode output voltage of the variable-frequency power supply 11 is smaller, which fails to drive the magnetron 12. Therefore, the magnetron 12 is in an off state. After the voltage of the commercial power supply exceeds the zero-crossing, the voltage of a network-side power supply gradually rises, and the absolute value of the anode output voltage of the variable-frequency power supply 11 progressively increases, and increases gradually to an anode voltage corresponding to point a, that is, reaching the anode threshold voltage VT of the magnetron 12. In this case, the anode current It starts flowing through the magnetron 12. With a constant rise of the voltage of the commercial power supply, an absolute value of the anode current It progressively increases, and meanwhile, the absolute value of the anode voltage accordingly increases. When power-on time exceeds 5 ms, the voltage of the commercial power supply starts falling, and the anode voltage Ebm also falls and finally reaches the anode voltage corresponding to point b. After point b, since the anode voltage Ebm fails to drive the magnetron 12, the anode current It falls down to zero.

Further, when the time is a or b, the anode voltage is equal to the anode threshold voltage, and the user may select to acquire the anode voltage at point a or b to quickly calculate the anode threshold voltage.

Herein the anode voltage Ebm, the anode threshold voltage VT and the equivalent resistor R are involved in a function relationship as follows:

$$Ebm = VT + R*It, \text{ wherein } a < t < b$$

The cooling unit 14 may bring away the heat generated when the variable-frequency power supply 11 and the magnetron 12 operate, such that the variable-frequency power supply 11 and the magnetron 12 may reliably and stably operate.

In some embodiments, the rectifier and filter unit 111, the power converter unit 112, the high-voltage transformer 113 and the high-voltage rectifier and filter unit 114 may be summarized as a variable-frequency circuit. That is, the functions possessed by the rectifier and filter unit 111, the power converter unit 112, the high-voltage transformer 113 and the high-voltage rectifier unit 114 may be implemented in the form of the variable-frequency circuit. A person skilled in the art should understand that as a variable-frequency driver power supply for driving the magnetron 12, in addition to the above described electronic units (for example, the rectifier and filter unit 111, the power converter unit 112, the high-voltage transformer 113 and the high-voltage rectifier unit 114), other electronic units may be added to the variable-frequency circuit according to the service needs to further implement the other application needs.

Based on the above described microwave apparatus 10, when the microwave apparatus 10 heats the load 131, due to uncertainty of the load 131, the magnetron 12 is apt to operate in an over-temperature state. For example, during popcorn making by using a microwave oven, at an initial stage, moisture in the corn is sufficient and microwaves output by the magnetron are mostly absorbed by the corn, and in this case, temperature rise of the magnetron is relatively slow. However, when the popcorn popping is coming to an end, the corn contains less moisture, and most of the microwaves may not be absorbed by the corn and may be reflected back to the magnetron, which may cause an abrupt rise of the temperature of the magnetron. According to statistical data from the market, damage of the magnetron accounts for 50% of the failures of household microwave ovens, and the damage of the magnetron is mainly attributed to over-temperature.

Still for example, industrial microwave ovens are commonly used for drying materials, and at an initial stage, moisture in the materials is sufficient, and the temperature rise of the magnetron is controllable. When the drying of the materials is coming to an end, the materials contain less moisture, and a large quantity of microwaves is reflected back to the magnetron. As a result, the magnetron is subjected to severe heating, and thus the magnetron is apt to be damaged due to over-temperature. According to statistical data from the market, it is more common that the magnetrons of ordinary 2450 M industrial microwave apparatuses are damaged, and a damage rate reaches up to 15%, mainly due to over-temperature.

In addition, when the cooling unit 14 in the microwave apparatus 10 fails, since the heat of the magnetron 12 is not timely brought away, the temperature of the magnetron 12 abruptly rises. Consequently, the magnetron 12 is damaged.

Figure 2:
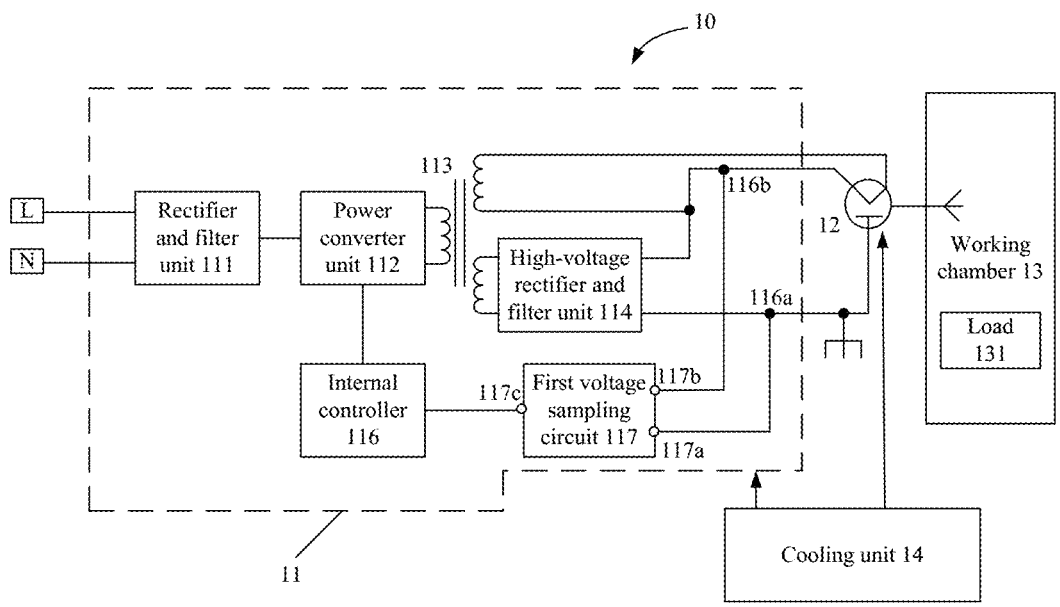
FIG. 2 is a schematic structural diagram of another microwave apparatus according to an embodiment of the present application.

Based on various defects of the above microwave apparatus, an embodiment of the present application provides another microwave apparatus. Different from the microwave apparatus as illustrated in FIG. 1, as illustrated in FIG. 2, the variable-frequency power supply of the microwave apparatus 10 further includes a first voltage sampling circuit 117, wherein the first voltage sampling circuit 117 includes a first input terminal 117a, a second input terminal 117b and a first output terminal 117c. The first input terminal 117a is connected to a first node 116a between the variable-frequency circuit and the magnetron 12, and the second input terminal 117b is connected to a second node 116b between the variable-frequency circuit and the magnetron 12. The first voltage sampling circuit 117 is configured to sample a first output voltage V0 of the variable-frequency circuit, wherein the first output voltage V0 is in a corresponding relationship with an anode voltage Ebm=f(V0) applied to two ends of the magnetron. The internal controller 116 calculates the anode voltage applied to the two ends of the magnetron 12 according to the corresponding relationship between the first output voltage and the anode voltage applied to the two ends of the magnetron 12. Further, the internal controller 16 regulates an anode temperature according to the anode voltage.

Specifically, the microwave apparatus regulates the anode temperature of the magnetron by the following working principles:

First, the variable-frequency power supply 11 operates according to a predetermined power. The predetermined power may be an initial power defaulted in the variable-frequency power supply 11. During the operation, the internal controller 116 receives the anode voltage of the magnetron that is fed back by the first voltage sampling circuit 117.

Then, the internal controller 116 may calculate the anode temperature of the magnetron 12 according to the anode voltage of the magnetron 12.

Figure 3:
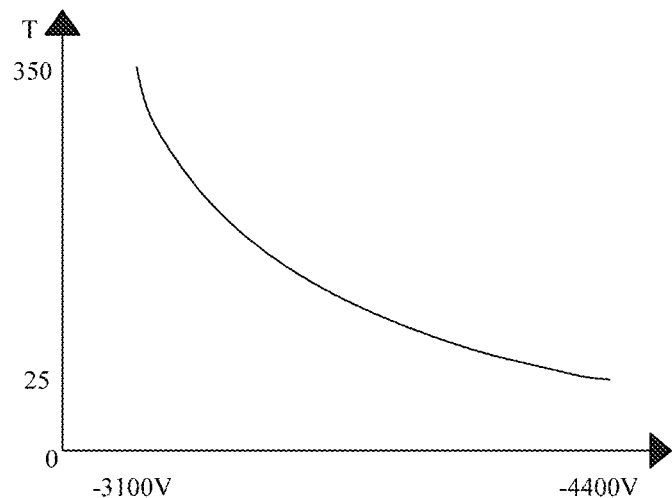
FIG. 3 is a schematic diagram of a relationship between an anode temperature and an anode voltage of a 1 KW and 2450 M magnetron according to an embodiment of the present application.

Specifically, referring to FIG. 3, FIG. 3 is a schematic diagram of a relationship between an anode temperature and an anode threshold voltage of a 1 KW and 2450 M magnetron according to an embodiment of the present application. As illustrated in FIG. 3, the abscissa denotes the anode threshold voltage of the magnetron 12, and the ordinate denotes the anode temperature of the magnetron 12. When the magnetron 12 operates, the anode temperature of the magnetron 12 progressively rises, and the corresponding anode threshold voltage increases accordingly. Apparently, when the anode temperature of the magnetron 12 reaches 350° C., the anode threshold voltage of the magnetron 12 has risen to −3100 V. In this case, the life time of the magnetron 12 is drastically shortened, and the magnet mounted on the anode of the magnetron is subject to a risk of magnetic flux.

In general, as illustrated in FIG. 3, the anode temperature to of the magnetron 12 is positively correlated to the anode threshold voltage VT, and such a relationship therebetween may be expressed by the following formula (1):

$$ta = f(VT) \quad (1)$$

Figure 4:
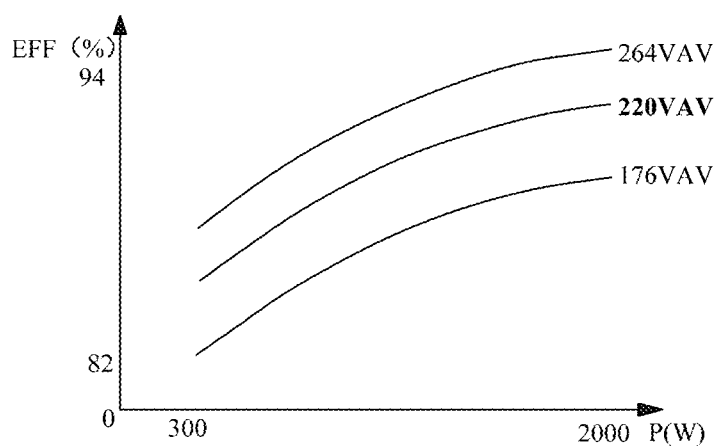
FIG. 4 is a schematic diagram of a relationship between a power efficiency, an input power and an input voltage of a variable-frequency power supply according to an embodiment of the present application.

Referring to FIG. 4, FIG. 4 is a schematic diagram of a relationship between a power efficiency, an input power and an input voltage of a variable-frequency power supply according to an embodiment of the present application. As illustrated in FIG. 4, the abscissa denotes the input power of the variable-frequency power supply, and the ordinate denotes the power efficiency of the variable-frequency power supply. With respect to the same input voltage, the power efficiency of the variable-frequency power supply is positively correlated to the input power. With respect to the same input power, the power efficiency of the variable-frequency power supply is positively correlated to the input voltage.

In general, as illustrated in FIG. 4, the relationship between the power efficiency EFF, the input power Pin and the input voltage Vin of the variable-frequency power supply may be expressed by the following formula (2):

$$EFF = f(Vin, Pin) \quad (2)$$

The variable-frequency power supply operates in a pre-determined power operating mode, and the input power Pin for actual operating is known. If the power efficiency EFF is known, the output power Po may be calculated by using the following formula (3):

$$Po = Pin * Eff \quad (3)$$

After the output power Po is calculated, the anode voltage Ebm may be calculated according to the acquired anode current It flowing through the magnetron in combination with the following formula (4):

$$Ebm = Po/It \quad (4)$$

As described above, the internal controller 116 calculates the anode voltage Ebm applied to the two ends of the magnetron 12 according to the first output voltage of the variable-frequency circuit sampled by the first voltage sampling circuit 117. That is, the anode voltage Ebm is known. Generally, in practice, the anode voltage of the magnetron 12 is generally greater than 1000 V, and thus the cost in directing acquiring the anode voltage Ebm of the magnetron 12 by an external voltage detection device is high, and the acquisition is complex. Therefore, according to this embodiment, by acquiring the first output voltage of the variable-frequency circuit, the anode voltage Ebm is indirectly inferred, which is simple and convenient, and saves cost.

Therefore, when the internal controller 116 acquires the input power Pin and the input voltage Vin of the variable-frequency power supply 11, the internal controller 116 determines the power efficiency EFF according to the corresponding relationship between the input power Pin, the input voltage Vin and the power efficiency EFF of the variable-frequency power supply (in combination with the formula (2) as illustrated in FIG. 4). Then, the internal controller 116 calculates the output power Po of the variable-frequency power supply 11 according to the formula (3). Subsequently, the internal controller 116 operates according to the following formulas:

$$Ebm = VT + R*It$$

$$It = Po/Ebm$$

$$Po = Pin*Eff$$

$$Ebm = f(V0)$$

Wherein, R denotes an equivalent resistance of the magnetron, R, Pin, Eff, V0 and f(V0) are known. Therefore, in combination with the above formulas, the anode threshold voltage VT may be calculated.

Finally, the internal controller 116 calculates the anode temperature of the magnetron 12 according to the anode threshold voltage of the magnetron 12 in combination with the formula (1).

The internal controller 116 regulates the output power Po of the variable-frequency power supply 11 according to the anode temperature of the magnetron, wherein the output power Po is configured to drive the magnetron 12 to operate, to change the anode temperature of the magnetron 12.

Specifically, the internal controller 116 judges whether the anode temperature of the magnetron 12 is greater than a predetermined temperature threshold, and reduces the output power Po of the variable-frequency power supply 11 to lower the anode temperature of the magnetron if the anode temperature of the magnetron 12 is greater than the predetermined temperature threshold. If the anode temperature of the magnetron 12 is less than the predetermined temperature threshold, the internal controller 116 maintains operation of the variable-frequency power supply 11. That is, the original output power Po of the variable-frequency power supply 11 may be maintained, and the output power Po of the variable-frequency power supply 11 may be increased on the premise that the anode temperature of the magnetron 12 is less than the predetermined temperature threshold. The predetermined temperature threshold herein may be defined by a user according to the service needs.

In some embodiments, when the anode temperature of the magnetron 12 is greater than the predetermined temperature threshold, in the process that the internal controller 116 reduces the output power Po of the variable-frequency power supply 11, the internal controller 116 judges whether the output power Po of the variable-frequency power supply 11 is greater than a predetermined minimum power, and maintains operation of the variable-frequency power supply 11 and continuously detects the anode temperature of the magnetron 12 if the output power Po of the variable-frequency power supply 11 is greater than the predetermined minimum power. If the output power Po of the variable-frequency power supply 11 is less than the predetermined minimum power, it indicates that the variable-frequency power supply 11 loses the capability of controlling the anode temperature of the magnetron 12. In this case, even if the variable-frequency power supply 11 is made to operate according to the predetermined minimum power, the anode temperature of the magnetron 12 is still subject to over-temperature. Accordingly, the internal controller 116 should stop operation of the variable-frequency power supply 11, to prevent the magnetron 12 from operating in an over-temperature state. In addition, when the cooling unit 14 in the microwave apparatus 10 fails, for example, a cooling pump, or a fan or the like fails, it is possible in this case that the variable-frequency power supply 11 operates according to the predetermined minimum power, and the magnetron 12 may also subject to be over-temperature. Therefore, in this case, it is necessary to shut down the variable-frequency power supply.

In general, the above embodiments illustrate a regulation fashion of "calculating the anode temperature of the magnetron according to the anode voltage of the magnetron, and further regulating the output power of the variable-frequency power supply according to the anode temperature of the magnetron". In some embodiments, the internal controller 116 may also determine the output power of the variable-frequency power supply 11 according to the anode threshold voltage of the magnetron 12 by directly looking up the table, and hence regulate the output power of the variable-frequency power supply 11. Therefore, first, the internal controller 116 acquires a predetermined association table. The predetermined association table is pre-established by the user according to experience and practice, wherein the predetermined association table pre-stores a mapping relationship between the anode threshold voltage of the magnetron 12 and the output power of the variable-frequency power supply 11. Then, during regulation of the anode temperature of the magnetron 12, the internal controller 116 traverses the predetermined association table according to the calculated anode threshold voltage of the magnetron, and searches out the output power of the variable-frequency power supply 11 corresponding to the anode threshold voltage of the magnetron 12 from the predetermined association table. Finally, the internal controller 116 regulates the current output power of the variable-frequency power supply 11 to the output power that is searched out, and in this case, regulation of the anode temperature of the magnetron 12 is completed.

In summary, since in the embodiment of the present application, the anode voltage accurately reflecting the magnetron 12 is directly acquired to indirectly acquire the anode threshold voltage of the magnetron such that the anode temperature may be accurately determined, at least the following merits are achieved: In direct detection of the temperature of the magnetron based on detection of a temperature parameter by a temperature sensor arranged on the housing of the magnetron 12, since the housing of the magnetron 12 is made of iron, and thermal conductivity thereof is poor; therefore, under different cooling conditions, the temperature of the housing fails to actually reflect the real anode temperature of the magnetron 12. In addition, the cost of arranging the temperature sensor is high, and a corresponding circuit also needs to be arranged to process temperature information. Therefore, this solution is not advantageous in terms of cost. However, in the embodiment of the present application, the anode voltage accurately reflecting the magnetron 12 may be directly acquired to indirectly acquire the anode threshold voltage of the magnetron 12, such that the anode temperature may be accurately determined, so as to accurately and reliably adjust the anode temperature by regulating the output power of the variable-frequency power supply 11, and prevent over-temperature-induced damage of the magnetron 12.

In some embodiments, in addition to the above way of determining the anode threshold voltage applied to the two ends of the magnetron, the anode threshold voltage may also be determined according to the corresponding relationship between the anode threshold voltage of the magnetron and the input power of the variable-frequency power supply. For example, if the input power of the variable-frequency power supply falls within a predetermined power range, determining the anode voltage corresponding to the input power of the variable-frequency power supply as an anode threshold voltage. The predetermined power range is determined according to design of the product, and the predetermined power range may be a single-point input power value, for example, an instantaneous power value at a specific moment.

In addition the above embodiment, the output power of the variable-frequency power supply may also be regulated according to the embodiment hereinafter. For example, by determining the anode current flowing through the magnetron, the output power of the variable-frequency power supply may be regulated according to the anode current. Specifically, as illustrated in FIG. 1b, if the anode current is Ia or Ib or in the vicinity of Ia or Ib, the anode voltage corresponding to Ia or Ib is the anode threshold voltage VT, or the anode voltage corresponding to the anode current in the vicinity of Ia or Ib may be estimated to be equivalent to the anode threshold voltage VT. Since the anode threshold voltage VT is in a mapping relationship with the anode current Ia or Ib with respect to each magnetron, the user may establish a mapping table between the anode threshold voltage VT and the anode current Ia or Ib, and thus determine the anode threshold voltage VT by looking up the mapping table according to the sampled anode current Ia or Ib.

Still for example, by determining the input power of the variable-frequency power supply, the output power of the variable-frequency power supply may also be regulated according to the input power of the variable-frequency power supply. Specifically, as illustrated in FIG. 1b and FIG. 4, the input power of the variable-frequency power supply is in a function relationship with the anode current Ia or Ib, and the anode threshold voltage VT is in a mapping relationship with the anode current Ia or Ib with respect to each magnetron, the user may establish a mapping table between the anode threshold voltage VT and the input power, and thus determine the anode threshold voltage VT by looking up the mapping table according to the input power.

Still for example, by determining the anode voltage applied to the two ends of the magnetron, the output power of the variable-frequency power supply may also be regulated according to the anode voltage. Specifically, the user may establish a mapping table between the anode threshold voltage VT and the anode voltage, and thus determine the anode threshold voltage VT by looking up the mapping table according to the anode voltage.

In summary, the output power of the variable-frequency power supply may be regulated in a variety of ways. It should be understood that any alternatives or variations derived by a person skilled in the art according to the teachings of the embodiments of the present application to regulate the output power of the variable-frequency power supply shall also be deemed as falling within the protection scope of the present application, which are thus not described herein any further.

Figure 5:
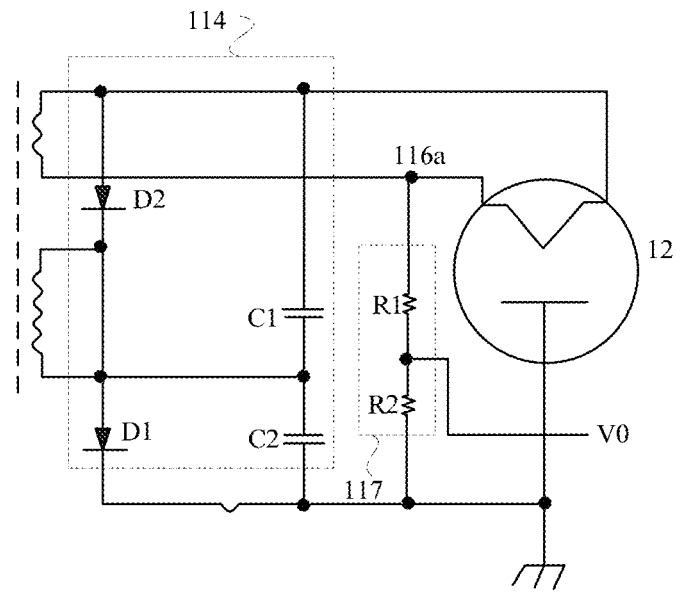
FIG. 5 is a schematic structural diagram of a first voltage sampling circuit according to an embodiment of the present application.

Referring to FIG. 5, the high-voltage rectifier and filter unit 114 includes: a first diode D1, a second diode D2, a first capacitor C1 and a second capacitor C2; wherein the first voltage sampling circuit 117 includes a first resistor R1 and a second resistor R2. One terminal of the first resistor R1 is connected to the first node 116a, the other terminal of the first resistor R1 and one terminal of the second resistor R1 are both connected to the second node 116b, and the other terminal of the second resistor R2 is connected to the ground. The first output voltage V0 is output and acquired from the second node 116b. Apparently, V0=Ebm*R2/(R1+R2). Therefore, if V0 is acquired, Ebm may be calculated.

Figure 5A:
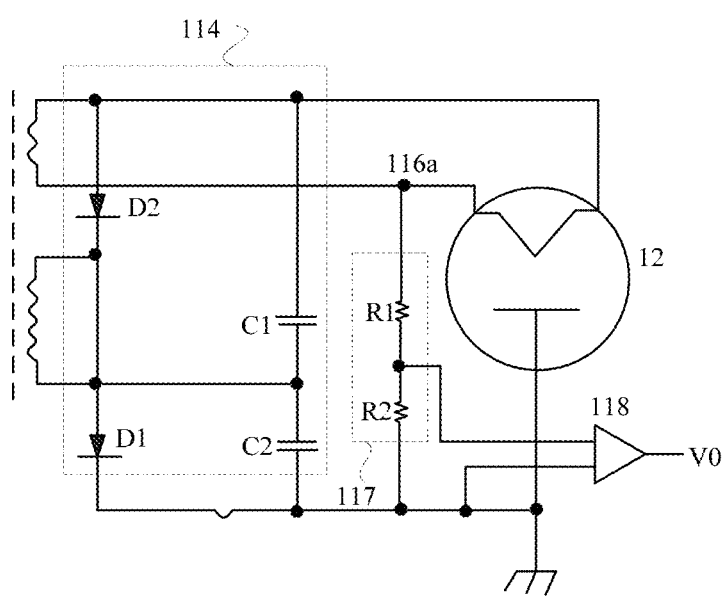
FIG. 5a is a schematic structural diagram of a first voltage sampling circuit according to another embodiment of the present application.

In some embodiments, for improvements of an amplitude of the sampled voltage and a load-carrying capability, as illustrated in FIG. 5a, different from the embodiment as illustrated in FIG. 5, the variable-frequency power supply 11 further includes an amplifier circuit 118, wherein an input terminal of the amplifier circuit 118 is connected to a first output terminal of the first voltage sampling circuit 117, and an output terminal of the amplifier circuit 118 is connected to the internal controller 116. The amplifier circuit 118 may be an operational amplifier, which may improve the amplitude of the first output voltage and the load-carrying capability.

Figure 6:
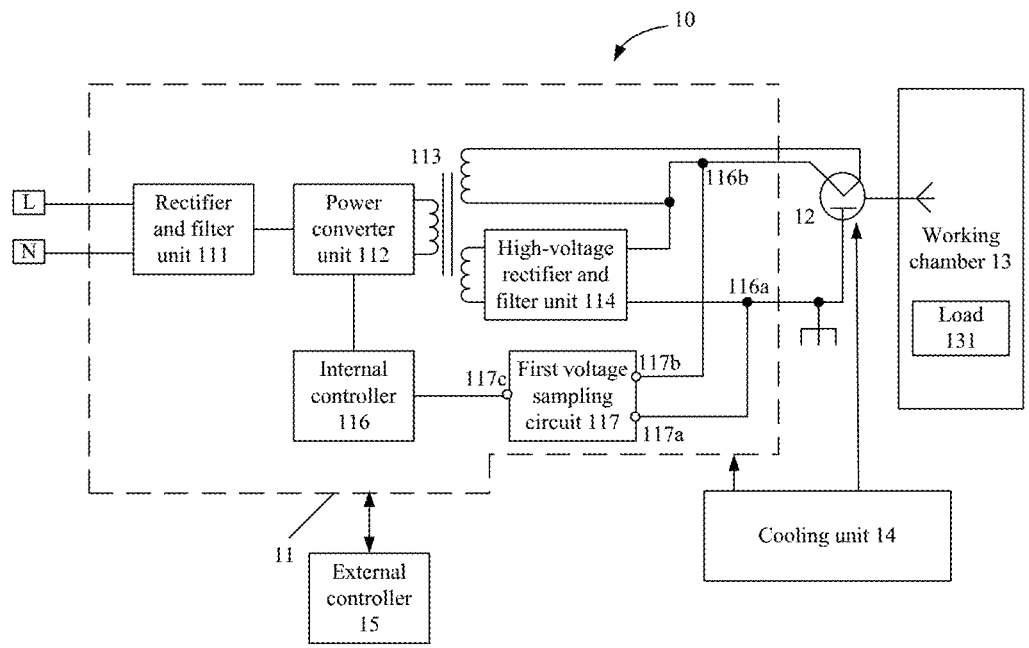
FIG. 6 is a schematic structural diagram of a microwave apparatus according to another embodiment of the present application.

Different from the above embodiments, as illustrated in FIG. 6, the microwave apparatus 10 further includes an external controller 15, wherein the external controller 15 is connected to the variable-frequency power supply 11. The external controller 15 sends target power information to the variable-frequency power supply 11, such that the power converter unit 112 in the variable-frequency power supply 11 converts the target power information to a pulse width modulation (PWM) signal or a pulse frequency modulation (PFM) signal or a hybrid wave of the two, and operates according to a rated power. In addition, the external controller 15 further receives various control information fed back by the variable-frequency power supply 11, to regulate the output power of the variable-frequency power supply. In this way, the system power is flexibly regulated, and operation of the variable-frequency power supply 11 is monitored.

In the above embodiments, it may be understood that the control logics for the temperature regulation for the magnetron according to the above embodiments may be practiced in the form of a software module, wherein the software module may be stored not only in the internal controller 116 in the variable-frequency power supply 11 in the form of instructions, but also in the external controller 15.

Figure 7:
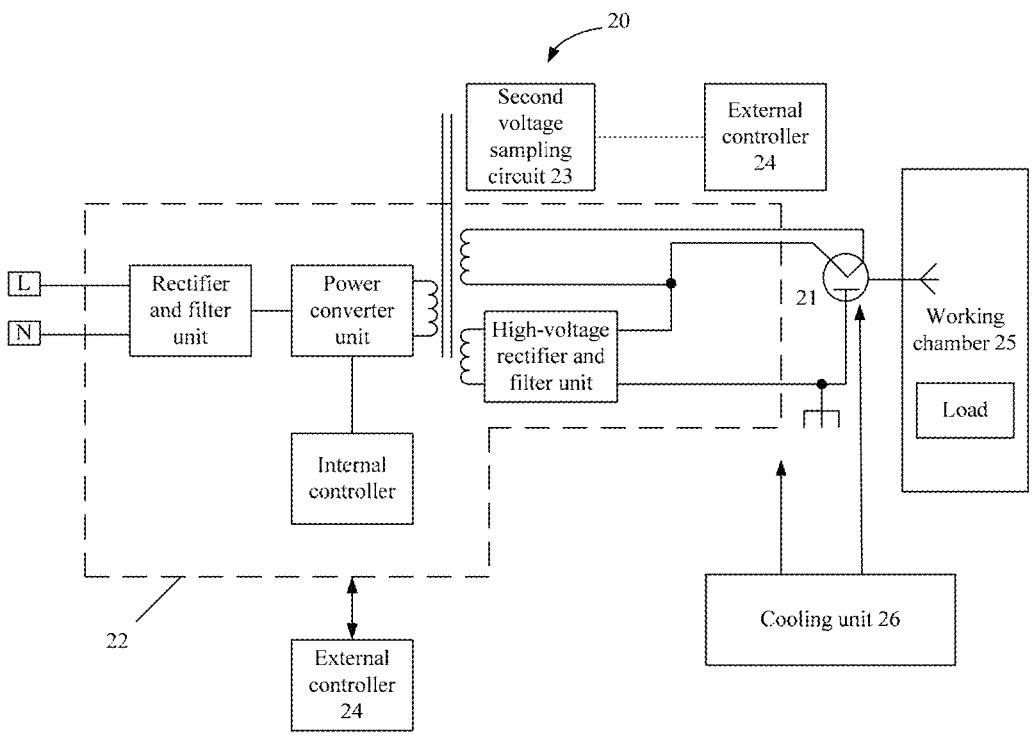
FIG. 7 is a schematic structural diagram of a microwave apparatus according to still another embodiment of the present application.

Accordingly, for differentiation from the above embodiments, as another aspect of the embodiments of the present application, an embodiment of the present application further provides a system for regulating a temperature of a magnetron. As illustrated in FIG. 7, the system 20 includes: a magnetron 21, a variable-frequency power supply 22, a second voltage sampling circuit 23, an external controller 24, a working chamber 25 and a cooling unit 26. The variable-frequency power supply 22 is connected to magnetron 21, and configured to drive the magnetron 21. The second voltage sampling circuit 23 is coupled between the variable-frequency power supply 22 and the magnetron 21, and configured to sample a second output voltage of the variable-frequency power supply 22, wherein the second output voltage is in a corresponding relationship with an anode voltage applied to two ends of the magnetron 21, and is further configured to sample an anode current flowing through the magnetron 21. The external controller 24 is connected to an output terminal of the second voltage sampling circuit 23 and the variable-frequency power supply 22 respectively.

In this embodiment, in the case of no conflict of the content, the magnetron 21, the variable-frequency power supply 22, the second voltage sampling circuit 23 and the external controller 24 may be referenced to the description of the above embodiments, which are not described herein any further.

As described above, as illustrated in FIG. 7, the external controller 24 herein stores several instructions for running the control logics for the temperature regulation for the magnetron, and the internal controller of the variable-frequency power supply 22 serves as a core for controlling normal operation of the variable-frequency power supply 22.

Analogously, descriptions of the internal controller 116 in the above embodiments all applies to the external controller 24, which are not given herein any further.

Figure 8:
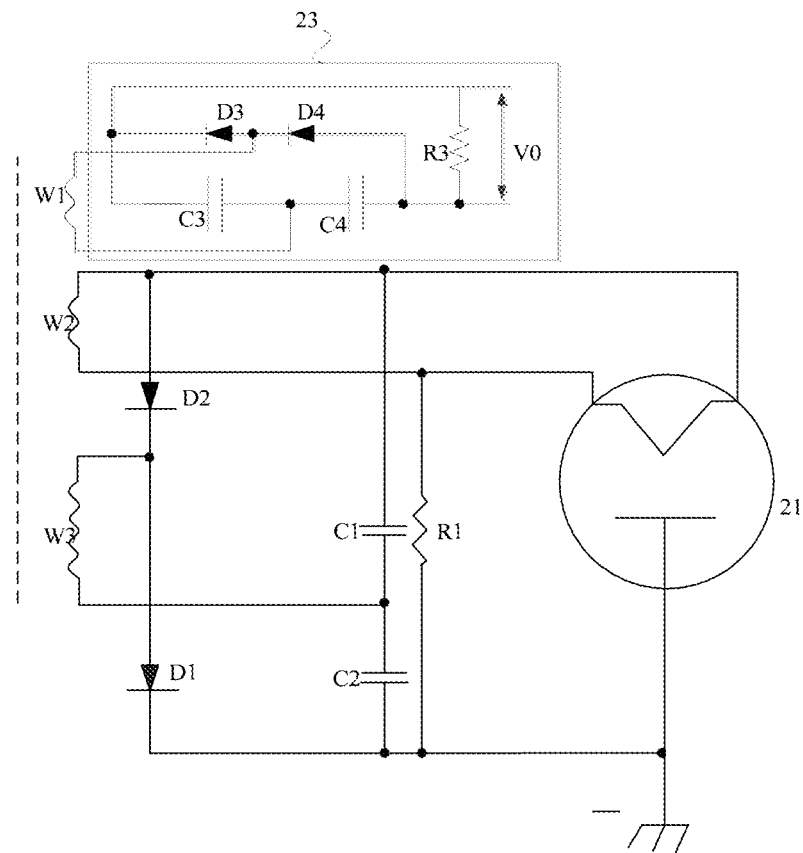
FIG. 8 is a schematic structural diagram of a second voltage sampling circuit according to an embodiment of the present application.

Different from the embodiment as illustrated in FIG. 5 or FIG. 5a or FIG. 6, as illustrated in FIG. 8, the second voltage sampling circuit 23 includes a first winding W1, a third capacitor C3, a fourth capacitor C4, a third diode D3, a fourth diode D4 and a third resistor R3, wherein the first winding W1 is in a proportional relationship with secondary windings W2 and W3 of the high-voltage rectifier and filter unit in the variable-frequency power supply 22. Therefore, if the voltage V0 at two ends of the third resistor R3 (that is, the second output voltage) is acquired, the anode voltage Ebm may be calculated according to the proportional relationship.

Figure 8A:
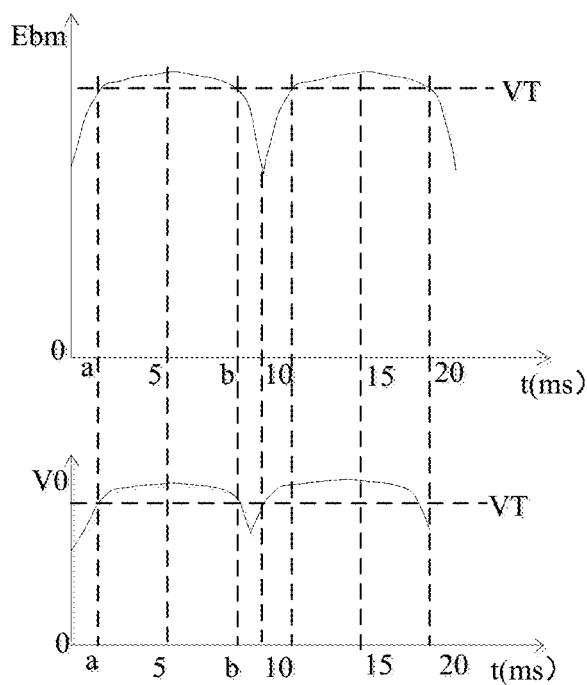
FIG. 8a is a schematic diagram of variations of an anode voltage applied to two ends of a magnetron and a second output voltage sampled by a second voltage sampling circuit with the time according to an embodiment of the present application.

As illustrated in FIG. 8a, a voltage waveform of the second output voltage V0 and a voltage waveform of the anode voltage Ebm are both a sinusoidal waveform. As known from FIG. 8a, if V0 is acquired, Ebm may be calculated. Therefore, according to the formulas provided in the above embodiments, the anode threshold voltage may be calculated, and thus the temperature of the magnetron may be regulated according to the anode threshold voltage.

In this embodiment, the system 20 for regulating the temperature of the magnetron may be applied to any type of microwave apparatuses.

In the above embodiments, the internal controller or the external controller, as a controller, may be a general processor, a digital signal processor (DSP), an application specific integrated circuit (ASIC), a field programmable gate array (FPGA), a microcontroller unit, an Advanced RISC machine (ARM), or another programmable logic device, a discrete gate or transistor logic device, or a discrete hardware component or a combination of these components. Further, the controller may also be any traditional processor, controller, microcontroller or state machine. The controller may also be practiced as a combination of computing devices, for example, a combination of a DSP and a microprocessor, a plurality of microprocessors, one or more microprocessors plus a DSP core, or any other such configuration.

Figure 9:
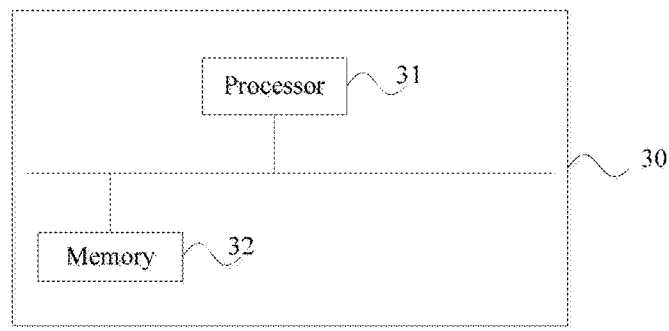
FIG. 9 is a schematic structural diagram of a controller according to an embodiment of the present application.

An embodiment of the present application further provides a controller. Referring to FIG. 9, FIG. 9 is a schematic structural diagram of a controller 30 according to an embodiment of the present application. As illustrated in FIG. 9, the controller 30 (the internal controller or the external controller) includes: at least one processor 31 and a memory 32 communicably connected to the at least one processor 31; wherein FIG. 9 uses one processor 31 as an example. The at least one processor 31 and the memory 32 may be connected via a bus or in another manner, and FIG. 9 uses the bus as an example.

The memory 32 stores instructions executable by the at least one processor, wherein, the instructions, when being executed by the at least one processor, cause the at least one processor 31 to run control logic for performing the temperature regulation for the magnetron.

Therefore, the controller 30 may timely regulate the output power of the variable-frequency power supply to regulate the anode temperature of the magnetron, such that the magnetron is prevented from damages due to over-temperature.

An embodiment of the present application provides a device for regulating a temperature of a magnetron. The device for regulating the temperature of the magnetron, as a software system, may be stored in the internal controller 116 in the variable-frequency power supply 11 as illustrated in FIG. 2 and FIG. 6, or may be stored in the external controller as illustrated in FIG. 7. The device for regulating the temperature of the magnetron includes several instructions. The several instructions are stored in the memory, and the processor may access the memory to call the instructions and execute the instructions to perform control logic for performing the temperature regulation for the magnetron.

Figure 10:
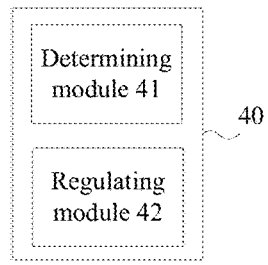
FIG. 10 is a schematic structural diagram of a device for regulating a temperature of a magnetron according to an embodiment of the present application.

As illustrated in FIG. 10, the device 40 for regulating the temperature of the magnetron includes: a determining module 41 and a regulating module 42.

The determining module 41 is configured to determine an anode current flowing through the magnetron or an input power of a variable-frequency power supply or an anode voltage applied to two ends of the magnetron, the input power or an output power of the variable-frequency power supply being configured to drive the magnetron to operate.

The regulating module 42 is configured to regulate the output power of the variable-frequency power supply according to the anode current or the input power or the anode voltage.

Therefore, the output power of the variable-frequency power supply may be timely regulated to regulate the anode temperature of the magnetron, such that the magnetron is prevented from damages due to over-temperature.

Figure 10A:
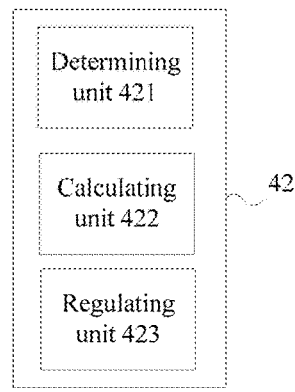
FIG. 10a is a schematic structural diagram of a regulating module in FIG. 10.

In some embodiments, as illustrated in FIG. 10a, the regulating module 42 includes a determining unit 421, a calculating unit 422 and a regulating unit 423.

The determining unit 421 is configured to determine the anode voltage applied to the two ends of the magnetron, an equivalent resistance of the magnetron and the output power of the variable-frequency power supply. The calculating unit 422 is configured to calculate an anode threshold voltage of the magnetron according to the anode voltage of the magnetron, the equivalent resistance of the magnetron and the output power of the variable-frequency power supply. The regulating unit 423 is configured to regulate the output power of the variable-frequency power supply according to the anode threshold voltage of the magnetron.

The device 40 may timely regulate the output power of the variable-frequency power supply to regulate the anode temperature of the magnetron, such that the magnetron is prevented from damages due to over-temperature.

Figure 11:
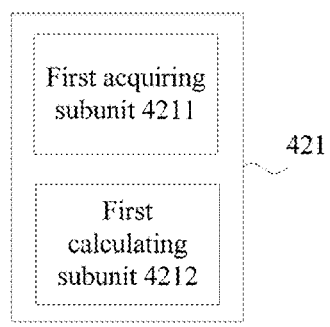

In some embodiments, as illustrated in FIG. 11, the determining unit 421 includes: a first acquiring subunit 4211 and a first calculating subunit 4212.

The first acquiring subunit 4211 is configured to acquire an input power and an input voltage of the variable-frequency power supply; and the first calculating subunit 4212 is configured to calculate the output power of the variable-frequency power supply according to a corresponding relationship between the input power and the input voltage of the variable-frequency power supply and a power efficiency.

Figure 12:
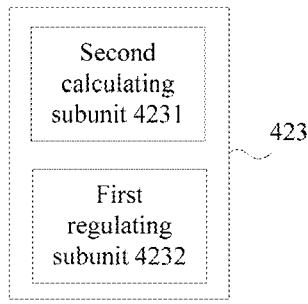

In some embodiments, as illustrated in FIG. 12, the regulating unit 423 includes: a second calculating subunit 4231 and a first regulating subunit 4232.

The second calculating subunit 4231 is configured to calculate an anode temperature of the magnetron according to the anode threshold voltage; and the first regulating subunit 4232 is configured to regulate the output power of the variable-frequency power supply according to the anode temperature of the magnetron.

Figure 13:
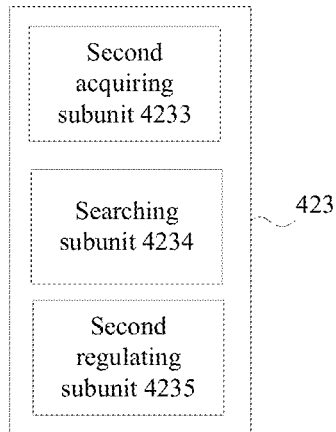

Different from the embodiment as illustrated in FIG. 12, as illustrated in FIG. 13, the regulating unit 423 includes: a second acquiring subunit 4233, a searching subunit 4234 and a second regulating subunit 4235.

The second acquiring subunit 4233 is configured to acquire a predetermined association table, the association table pre-storing a mapping relationship between the anode threshold voltage of the magnetron and the output power of the variable-frequency power supply; the searching subunit 4234 is configured to search for the output power of the variable-frequency power supply corresponding to the anode threshold voltage of the magnetron from the predetermined association table; and the second regulating subunit 4235 is configured to regulate the output power of the variable-frequency power supply to the output power that is searched out.

Figure 14:
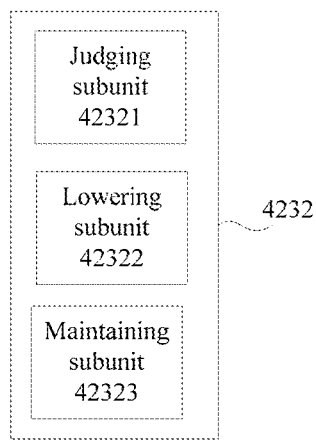
FIG. 14 is a schematic structural diagram of a first regulating subunit in FIG. 12.

In some embodiments, as illustrated in FIG. 14, the first regulating subunit 4232 includes: a judging subunit 42321, a lowering subunit 42322 and a maintaining subunit 42323.

The judging subunit 42321 is configured to judge whether the anode temperature of the magnetron is greater than a predetermined temperature threshold; the lowering subunit 42322 is configured to lower the output power of the variable-frequency power supply if the anode temperature of the magnetron is greater than the predetermined temperature threshold; and the maintaining subunit 42323 is configured to maintain operation of the variable-frequency power supply if the anode temperature of the magnetron is less than the predetermined temperature threshold.

In some embodiments, the lowering subunit 42322 is specifically configured to: determine the output power of the variable-frequency power supply; judge whether the output power of the variable-frequency power supply is greater than a predetermined minimum power; maintain operation of the variable-frequency power supply if the output power of the variable-frequency power supply is greater than the predetermined minimum power; and stop operation of the variable-frequency power supply if the output power of the variable-frequency power supply is less than the predetermined minimum power.

Since the device embodiments are based on the same inventive concept as the above embodiments, in the case of no confliction of the content, the content of the device embodiments may be referenced to that of the above embodiments, which is not described herein any further.

As still another aspect of the embodiments of the present application, an embodiment of the present application provides a method for regulating a temperature of a magnetron. The functions of the method for regulating the temperature of the magnetron according to the embodiment of the present application may also be implemented by virtue of a hardware platform in addition to being implemented by virtue of the software system of the device for regulating the temperature of the magnetron as illustrated in FIG. 10 to FIG. 14. For example, the method for regulating the temperature of the magnetron may be performed in a suitable type of electronic equipment having a processor having computing capabilities, for example, a microcontroller unit, a digital signal processor (DSP), a programmable logic controller (PLC), or the like.

The functions corresponding to the method for regulating the temperature of the magnetron according to the embodiments hereinafter are stored in a memory of the electronic equipment in the form of instructions. When the functions need to be implemented, a processor of the electronic equipment accesses the memory, and calls and executes the corresponding instructions to implement the functions corresponding to the method for regulating the temperature of the magnetron.

The memory, as a non-volatile computer-readable storage medium, may be configured to store non-volatile software programs, non-volatile computer-executable programs and modules, for example, the program instructions/the modules (for example the modules and the units as illustrated in FIG. 10 to FIG. 14) corresponding to the device 40 for regulating the temperature of the magnetron in the above embodiments, or the steps corresponding to the method for regulating the temperature of the magnetron in the embodiments hereinafter. The processor performs various function applications and data processing of the device 40 for regulating the temperature of the magnetron by running the non-volatile software programs, the instructions and the modules stored in the memory, that is, performing the functions of the modules and the units in the device 40 for regulating the temperature of the magnetron or the functions of the steps corresponding to the method for regulating the temperature of the magnetron according to the embodiments hereinafter.

The memory may include a high speed random access memory, or include a non-volatile memory, for example, at least one disk storage device, a flash memory device, or another non-volatile solid storage device. In some embodiments, the memory optionally includes memories remotely configured relative to the processor. These memories may be connected to the processor over a network. Examples of the above network include, but not limited to, the Internet, Intranet, local area network, mobile communication network and a combination thereof.

The program instructions/the modules are stored in the memory, which, when being executed by at least one processor, cause the at least one processor to perform the method for regulating the temperature of the magnetron in any of the above method embodiments, for example, performing the steps in the methods according to the embodiments as illustrated in FIG. 15 to FIG. 20, and implementing the functions of the modules and the units in the device according to the embodiments as illustrated in FIG. 10 to FIG. 14.

Figure 15:
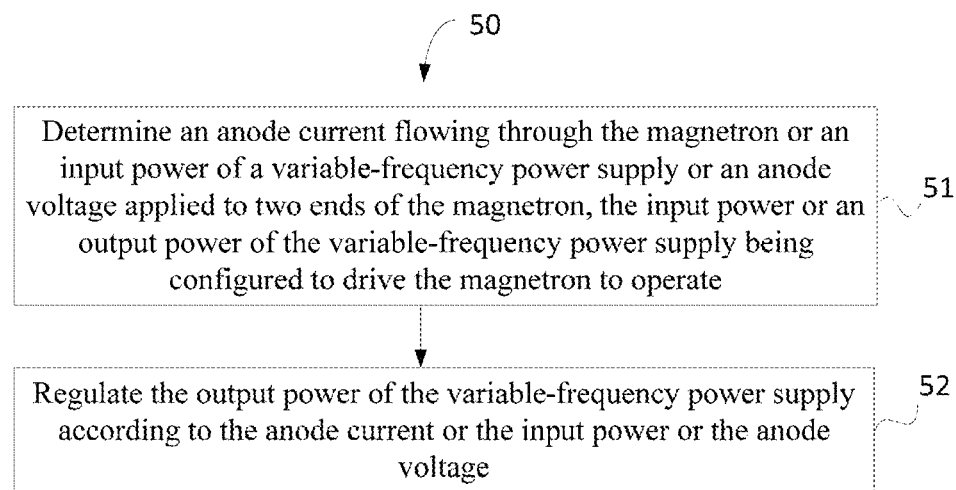
FIG. 15 is a schematic flowchart of a method for regulating a temperature of a magnetron according to an embodiment of the present application.

As illustrated in FIG. 15, the method 50 for regulating the temperature of the magnetron includes:

step 51: determining an anode current flowing through the magnetron or an input power of a variable-frequency power supply or an anode voltage applied to two ends of the magnetron, the input power or an output power of the variable-frequency power supply being configured to drive the magnetron to operate;

step 52: regulating the output power of the variable-frequency power supply according to the anode current or the input power or the anode voltage.

In step 51, determining the anode voltage applied to the two ends of the magnetron includes: if the input power of the variable-frequency power supply falls within a predetermined power range, determining the anode voltage corresponding to the input power of the variable-frequency power supply as an anode threshold voltage.

By this method, the output power of the variable-frequency power supply may be timely regulated to regulate the anode temperature of the magnetron, such that the magnetron is prevented from damages due to over-temperature.

Figure 15A:
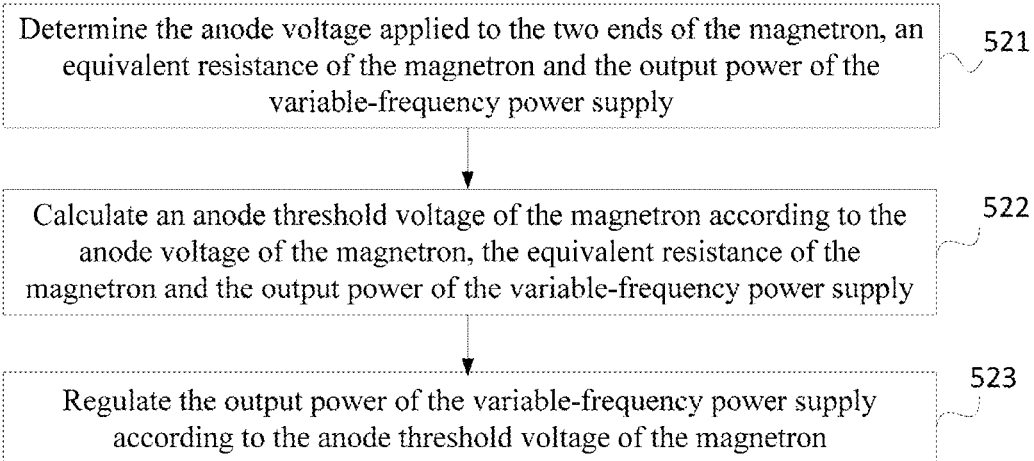
FIG. 15a is a schematic flowchart of step 52 in FIG. 15.

In some embodiments, as illustrated in FIG. 15a, step 52 includes:

step 521: determining the anode voltage applied to the two ends of the magnetron, an equivalent resistance of the magnetron and the output power of the variable-frequency power supply;

step 522: calculating an anode threshold voltage of the magnetron according to the anode voltage of the magnetron, the equivalent resistance of the magnetron and the output power of the variable-frequency power supply;

step 523: regulating the output power of the variable-frequency power supply according to the anode threshold voltage of the magnetron.

Figure 16:
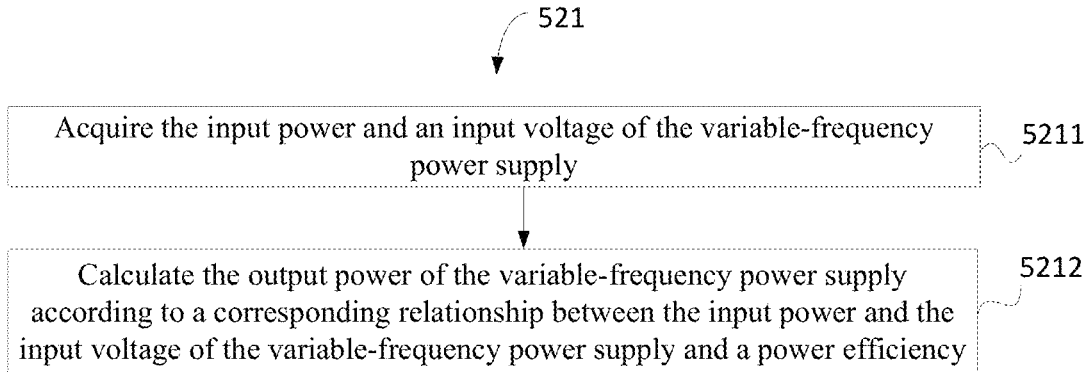

In some embodiments, as illustrated in FIG. 16, step 521 includes:

step 5211: acquiring the input power and an input voltage of the variable-frequency power supply;

step 5212: calculating the output power of the variable-frequency power supply according to a corresponding relationship between the input power and the input voltage of the variable-frequency power supply and a power efficiency.

Figure 17:
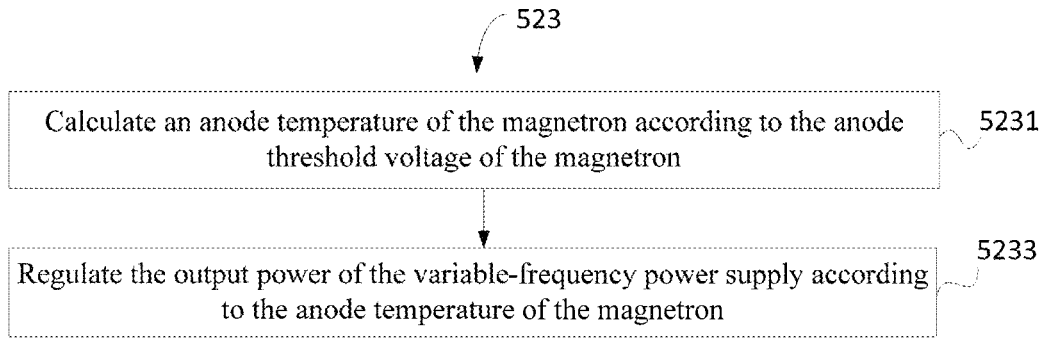

In some embodiments, as illustrated in FIG. 17, step 523 includes:

step 5231: calculating an anode temperature of the magnetron according to the anode threshold voltage of the magnetron;

step 5233: regulating the output power of the variable-frequency power supply according to the anode temperature of the magnetron.

Figure 18:
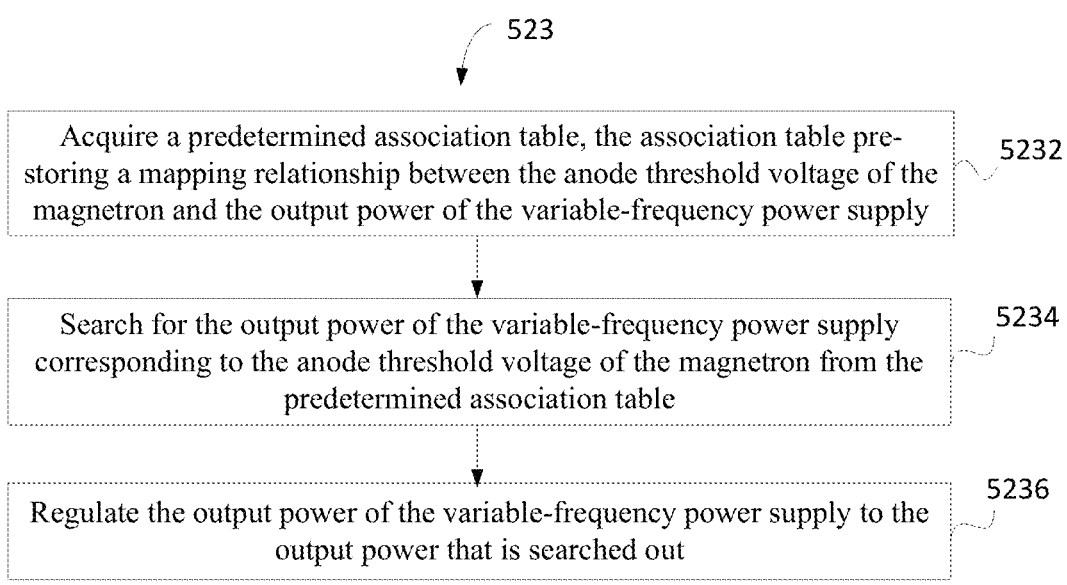

Different from the embodiment as illustrated in FIG. 17, as illustrated in FIG. 18, step 523 includes:

step 5232: acquiring a predetermined association table, the association table pre-storing a mapping relationship between the anode threshold voltage of the magnetron and the output power of the variable-frequency power supply;

step 5234: searching for the output power of the variable-frequency power supply corresponding to the anode threshold voltage of the magnetron from the predetermined association table;

step 5236: regulating the output power of the variable-frequency power supply to the output power that is searched out.

Figure 19:
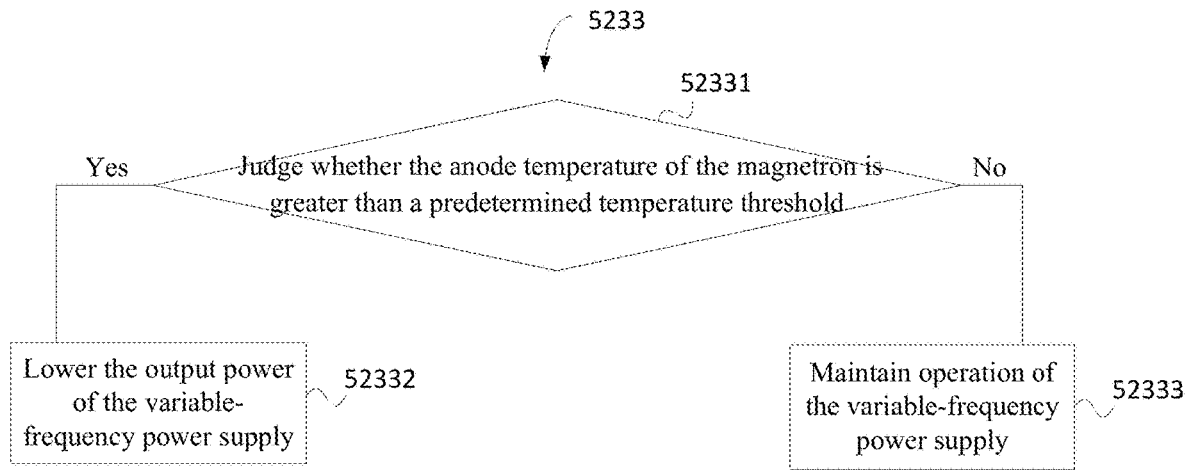
FIG. 19 is a schematic flowchart of step 5233 in FIG. 17.

In some embodiments, as illustrated in FIG. 19, step 5233 includes:

step 52331: judging whether the anode temperature of the magnetron is greater than a predetermined temperature threshold;

step 52332: lowering the output power of the variable-frequency power supply if the anode temperature of the magnetron is greater than the predetermined temperature threshold;

step 52333: maintaining operation of the variable-frequency power supply if the anode temperature of the magnetron is less than the predetermined temperature threshold.

Figure 20:
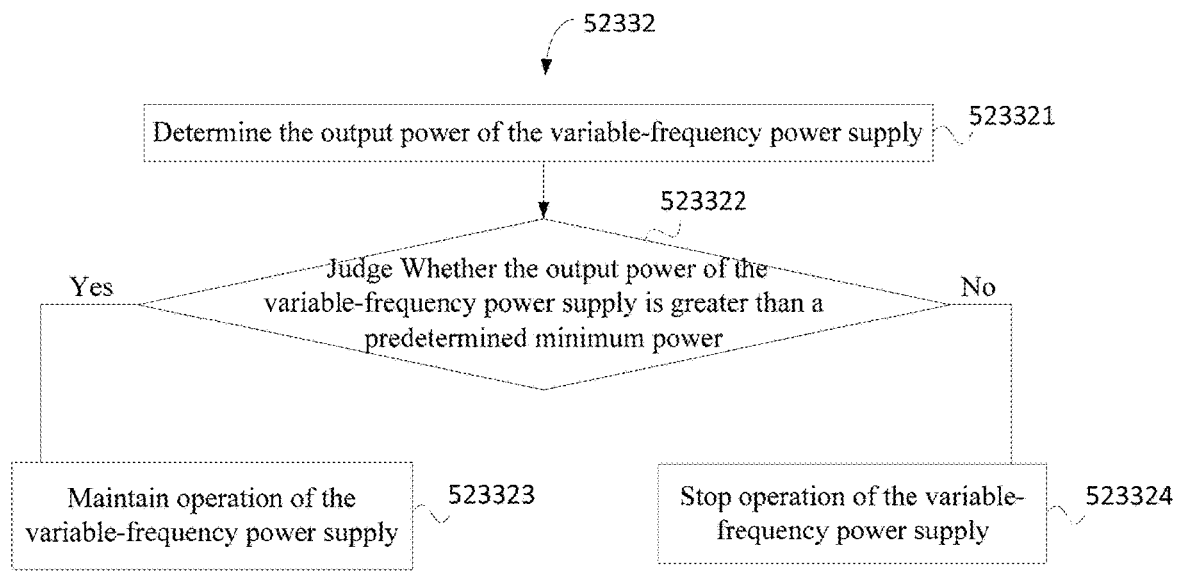
FIG. 20 is a schematic flowchart of step 52332 in FIG. 19.

In some embodiments, as illustrated in FIG. 20, step 52332 includes:

step 523321: determining the output power of the variable-frequency power supply;

step 523322: judging whether the output power of the variable-frequency power supply is greater than a predetermined minimum power;

step 523323: maintaining operation of the variable-frequency power supply if the output power of the variable-frequency power supply is greater than the predetermined minimum power;

step 523324: stopping operation of the variable-frequency power supply if the output power of the variable-frequency power supply is less than the predetermined minimum power.

Since the device embodiments are based on the same inventive concept as the method embodiments, in the case of no confliction of the content, the content of the method embodiments may be referenced to that of the device embodiment, which is not described herein any further.

As still another aspect of the embodiments of the present application, an embodiment of the present application further provides a non-transitory computer-readable storage medium which stores computer-executable instructions. The computer-executable instructions, when being executed by a microwave apparatus, causes the microwave apparatus to perform the method for regulating the temperature of the magnetron as described above, for example, performing the method for regulating the temperature of the magnetron in any of the above method embodiments, or for example, performing the device for regulating the temperature of the magnetron in any of the above device embodiments.

By this method, the output power of the variable-frequency power supply may be timely regulated to regulate the anode temperature of the magnetron, such that the magnetron is prevented from damages due to over-temperature.

Finally, it should be noted that the above embodiments are merely used to illustrate the technical solutions of the present application rather than limiting the technical solutions of the present application. Under the concept of the present application, the technical features of the above embodiments or other different embodiments may be combined, the steps therein may be performed in any sequence, and various variations may be derived in different aspects of the present application, which are not detailed herein for brevity of description. Although the present application is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present application.

What is claimed is:

1. A method for regulating a temperature of a magnetron, comprising:
    determining an anode current flowing through the magnetron or an input power of a variable-frequency power supply or an anode voltage applied to two ends of the magnetron, an output power of the variable-frequency power supply being configured to drive the magnetron to operate;
    determining an anode threshold voltage of the magnetron according to the anode current or the input power or the anode voltage, wherein the anode temperature of the magnetron is positively correlated to the anode threshold voltage and
    regulating the output power of the variable-frequency power supply according to the anode threshold voltage of the magnetron to change the anode temperature of the magnetron, wherein the anode threshold voltage of the magnetron is a stabilized voltage of a Zener diode of an equivalent circuit model of the magnetron.

2. The method according to claim 1, wherein determining the anode threshold voltage of the magnetron according to the anode voltage comprises:
    determining the anode voltage applied to the two ends of the magnetron, an equivalent resistance of the magnetron and the output power of the variable-frequency power supply;
    calculating the anode threshold voltage of the magnetron according to the anode voltage of the magnetron, the equivalent resistance of the magnetron and the output power of the variable-frequency power supply.

3. The method according to claim 2, wherein determining the output power of the variable-frequency power supply comprises:
    acquiring the input power and an input voltage of the variable-frequency power supply;
    calculating the output power of the variable-frequency power supply according to a corresponding relationship between the input power and the input voltage of the variable-frequency power supply and a power efficiency thereof.

4. The method according to claim 2, wherein regulating the output power of the variable-frequency power supply according to the anode threshold voltage of the magnetron comprises:
    calculating an anode temperature of the magnetron according to the anode threshold voltage of the magnetron;
    regulating the output power of the variable-frequency power supply according to the anode temperature of the magnetron.

5. The method according to claim 4, wherein regulating the output power of the variable-frequency power supply according to the anode temperature of the magnetron comprises:
    determining whether the anode temperature of the magnetron is greater than a predetermined temperature threshold;
    lowering the output power of the variable-frequency power supply if the anode temperature of the magnetron is greater than the predetermined temperature threshold;
    maintaining operation of the variable-frequency power supply if the anode temperature of the magnetron is less than the predetermined temperature threshold.

6. The method according to claim 5, wherein lowering the output power of the variable-frequency power supply comprises:
  determining the output power of the variable-frequency power supply;
  determining whether the output power of the variable-frequency power supply is greater than a predetermined minimum power;
  maintaining operation of the variable-frequency power supply if the output power of the variable-frequency power supply is greater than the predetermined minimum power; and
  stopping operation of the variable-frequency power supply if the output power of the variable-frequency power supply is less than the predetermined minimum power.

7. The method according to claim 1, wherein regulating the output power of the variable-frequency power supply according to the anode threshold voltage of the magnetron comprises:
  acquiring a predetermined association table, the association table pre-storing a mapping relationship between the anode threshold voltage of the magnetron and the output power of the variable-frequency power supply;
  searching for the output power corresponding to the anode threshold voltage of the magnetron from the predetermined association table;
  regulating the output power of the variable-frequency power supply to the output power that is searched out.

8. The method according to claim 1, wherein determining the anode threshold voltage of the magnetron according the anode voltage comprises:
  if the input power of the variable-frequency power supply falls within a predetermined power range, determining the anode voltage corresponding to the input power of the variable-frequency power supply as an anode threshold voltage.

9. A controller, comprising:
  at least one processor; and
  a memory communicably connected to the at least one processor; wherein the memory stores instructions executable by the at least one processor, wherein the instructions, when being executed by the at least one processor, cause the at least one processor to perform:
  determining an anode current flowing through the magnetron or an input power of a variable-frequency power supply or an anode voltage applied to two ends of the magnetron, an output power of the variable-frequency power supply being configured to drive the magnetron to operate;
  determining an anode threshold voltage of the magnetron according to the anode current or the input power or the anode voltage, and
  calculating an anode temperature of the magnetron according to the anode threshold voltage of the magnetron;
  regulating the output power of the variable-frequency power supply according to the anode temperature of the magnetron, wherein the anode threshold voltage of the magnetron is a stabilized voltage of a Zener diode of an equivalent circuit model of the magnetron.

10. The controller according to claim 9, wherein the instructions, when being executed by the at least one processor, further cause the at least one processor to perform:
  determining the anode voltage applied to the two ends of the magnetron, an equivalent resistance of the magnetron and the output power of the variable-frequency power supply;
  calculating the anode threshold voltage of the magnetron according to the anode voltage of the magnetron, the equivalent resistance of the magnetron and the output power of the variable-frequency power supply.

11. The controller according to claim 10, wherein the instructions, when being executed by the at least one processor, further cause the at least one processor to perform:
  acquiring the input power and an input voltage of the variable-frequency power supply;
  calculating the output power of the variable-frequency power supply according to a corresponding relationship between the input power and the input voltage of the variable-frequency power supply and a power efficiency thereof.

12. The controller according to claim 9, wherein the instructions, when being executed by the at least one processor, further cause the at least one processor to perform:
  determining whether the anode temperature of the magnetron is greater than a predetermined temperature threshold;
  lowering the output power of the variable-frequency power supply if the anode temperature of the magnetron is greater than the predetermined temperature threshold;
  maintaining operation of the variable-frequency power supply if the anode temperature of the magnetron is less than the predetermined temperature threshold.

13. The controller according to claim 12, wherein the instructions, when being executed by the at least one processor, further cause the at least one processor to perform:
  determining the output power of the variable-frequency power supply;
  determining whether the output power of the variable-frequency power supply is greater than a predetermined minimum power;
  maintaining operation of the variable-frequency power supply if the output power of the variable-frequency power supply is greater than the predetermined minimum power; and
  stopping operation of the variable-frequency power supply if the output power of the variable-frequency power supply is less than the predetermined minimum power.

14. A microwave apparatus, comprising:
  a magnetron
  a variable-frequency power supply, comprising a variable-frequency circuit, wherein the variable-frequency circuit is configured to drive the magnetron;
  a voltage sampling circuit, configured to sample a output voltage of the variable-frequency circuit, the output voltage being in a corresponding relationship with an anode voltage applied to two ends of the magnetron;
  a controller, connected to an output terminal of the voltage sampling circuit and the variable-frequency power supply or the variable-frequency circuit respectively, wherein the controller comprises at least one processor; and
  a memory communicably connected to the at least one processor; wherein the memory stores instructions executable by the at least one processor, wherein the instructions, when being executed by the at least one processor, cause the at least one processor to perform:
  determining an anode current flowing through the magnetron or an input power of a variable-frequency power supply or an anode voltage applied to two ends of the magnetron, an output power of the variable-frequency power supply being configured to drive the magnetron to operate;

determining an anode threshold voltage of the magnetron according to the anode current or the input power or the anode voltage, and regulating the output power of the variable-frequency power supply according to the anode threshold voltage of the magnetron, wherein the anode threshold voltage of the magnetron is a stabilized voltage of a Zener diode of an equivalent circuit model of the magnetron.

15. The microwave apparatus according to claim 14, wherein the instructions, when being executed by the at least one processor, further cause the at least one processor to perform:

determining the anode voltage applied to the two ends of the magnetron, an equivalent resistance of the magnetron and the output power of the variable-frequency power supply;

calculating the anode threshold voltage of the magnetron according to the anode voltage of the magnetron, the equivalent resistance of the magnetron and the output power of the variable-frequency power supply.

16. The microwave apparatus according to claim 15, wherein the instructions, when being executed by the at least one processor, further cause the at least one processor to perform:

acquiring the input power and an input voltage of the variable-frequency power supply;

calculating the output power of the variable-frequency power supply according to a corresponding relationship between the input power and the input voltage of the variable-frequency power supply and a power efficiency thereof.

17. The microwave apparatus according to claim 15, wherein the instructions, when being executed by the at least one processor, further cause the at least one processor to perform:

calculating an anode temperature of the magnetron according to the anode threshold voltage of the magnetron;

regulating the output power of the variable-frequency power supply according to the anode temperature of the magnetron.

18. The microwave apparatus according to claim 17, wherein the instructions, when being executed by the at least one processor, further cause the at least one processor to perform:

determining whether the anode temperature of the magnetron is greater than a predetermined temperature threshold;

if the anode temperature of the magnetron is greater than the predetermined temperature threshold, determining the output power of the variable-frequency power supply and determining whether the output power of the variable-frequency power supply is greater than a predetermined minimum power;

lowering the output power of the variable-frequency power supply if the output power of the variable-frequency power supply is greater than the predetermined minimum power; and stopping operation of the variable-frequency power supply if the output power of the variable-frequency power supply is less than the predetermined minimum power;

maintaining operation of the variable-frequency power supply if the anode temperature of the magnetron is less than the predetermined temperature threshold.

19. The microwave apparatus according to claim 14, wherein the voltage sampling circuit is arranged inside the variable-frequency power supply, and connected between the variable-frequency circuit and the magnetron, the variable-frequency power supply comprises an amplifier circuit; wherein an input terminal of the amplifier circuit is connected to the output terminal of the voltage sampling circuit, and an output terminal of the amplifier circuit is connected to the controller;

or, the voltage sampling circuit is arranged outside the variable-frequency power supply, and coupled between the variable-frequency power supply and the magnetron.

* * * * *